United States Patent [19]

Sowerwine

[11] 4,434,576
[45] Mar. 6, 1984

[54] SUPPORT SYSTEM FOR PLANTING TRAYS
[75] Inventor: Owen D. Sowerwine, Salinas, Calif.
[73] Assignee: Castle & Cooke Techniculture, Salinas, Calif.
[21] Appl. No.: 376,796
[22] Filed: May 10, 1982
[51] Int. Cl.³ .............................................. A47C 7/00
[52] U.S. Cl. ........................................ 47/39; 47/66; 47/73; 47/85; 47/86; 47/77
[58] Field of Search .................. 47/39, 66, 73, 85, 86, 47/77; 211/133, 128; 305/54

[56] References Cited
U.S. PATENT DOCUMENTS
3,829,174 8/1974 Thomas ................................. 305/54

Primary Examiner—Robert A. Hafer
Assistant Examiner—Bradley M. Lewis
Attorney, Agent, or Firm—Townsend and Townsend

[57] ABSTRACT

A support rail for use in supporting a planting tray during its initial growing period in a greenhouse. The support rail is especially suited for use with trays having a high-density matrix of small-sized soil plugs, and comprises a horizontally extending, vertically disposed web member and a pair of support members projecting from opposite sides of the web member at its lower extremity. The support members are angled downward from the horizontal so that a tray resting on support member will be supported along the tray's lower edges and not along the bottom surface. The rails are arranged in a uniformly spaced, parallel configuration, which provides stable support for a plurality of trays without providing a preferential growing environment for those soil plugs closest to the edges of the trays.

5 Claims, 4 Drawing Figures

SUPPORT SYSTEM FOR PLANTING TRAYS

BACKGROUND OF THE INVENTION

The invention relates to a system for supporting trays of seeded soil plugs during a period of greenhouse growth. More specifically, the invention is directed to a system for supporting trays with high-density arrays of seeded soil plugs in a greenhouse to insure proper initial growth of the plants before they are transplanted to the field.

In the transplant approach to crop cultivation the crops are started from seeds planted in soil plugs or soil masses, which are grown initially in greenhouses in a controlled environment. The greenhouse environment provides for an extremely high starting rate of the seeded soil masses. After the sprouted plants reach a certain level of maturity, they are transplanted to the field. Germination in the controlled environment of the greenhouse gives the plants a high probability of survival in the field.

U.S. Pat. Nos. 4,034,508 and 4,130,072, issued July 12, 1977, and Dec. 19, 1978, respectively, to Dedolph disclose a method of making an elastomeric soil plug, molded from a mixture including a soil compound such as peat moss, plant nutrients, and a biodegradable polymer resin binding the mixture together. In this technology transplant plugs can be formed with sufficiently small size and structural integrity to accomodate a single seed within an individual plug, and the seeded plugs can be carried by transplant trays in high-density arrays typically five-eighths inch on center. The seeds germinate and undergo their initial stages of growth under the controlled conditions of the greenhouse while in the trays, and the sprouted plugs are then transplanted from the trays to the field for further growth.

One of the advantages of the elastomeric soil plug technology is that it achieves a much greater uniformity in the harvested crop than has been attainable in the past. Although some variation in harvested crop will inevitably occur due to varying soil and weather conditions, the greater uniformity achieved with elastomeric soil plugs comes about because the entire process—fabricating and seeding the soil plugs, regulating the greenhouse environment in which the plants are nutured, and transplanting the sprouted plugs at controlled intervals and depths in the field—is amenable to automatic and highly regular machine handling. Uniformity of crop maturation time is, of course, highly desirable to minimize the amount of underripe or overripe crop harvested along with the bulk of properly ripened crop at harvest time.

In the greenhouses the trays are supported along their bottoms by elongate parallel rails, along which individual trays may be positioned to form long rows of abutting trays. During the greenhouse growing period even identically fabricated and seeded trays show a non-uniformity in the growth of seedlings in those plugs located along the supported sides of the trays. The rows of soil plugs at the support rails mature at a faster rate than those which are more removed from the rails, apparently due to different ambient environmental conditions, such as humidity and air circulation, in close proximity to the rails. Not only do the tops of the seedlings positioned along the support rails grow higher, but also the root systems of the seedlings grow beyond the soil plugs and through drain apertures in the bottoms of the trays into the interstices between the tray and support rails. Such seedlings develop differently in the field. In the first instance, they have a head start and consequently will mature and ripen at a faster rate once transplanted to the field. However, their overgrown root systems are more susceptible to damage during handling. Should the root system be damaged, the seedling will suffer root system shock and either mature at a lower rate or possibly die. Since the number of plugs along the supported edges of a tray amounts to roughly 10 percent of the total, the stimulated growth they experience can lead to significant variations in the crop at harvest time.

SUMMARY OF THE INVENTION

The invention provides a solution to the problem of preferential development experienced during the initial greenhouse growing period by seedlings positioned along the supported edges of high-density planting trays. In particular, the invention provides a support rail for supporting a planting tray of the type having a matrix of apertures therethrough which contain seeded soil plugs. The support rail of the present invention comprises, briefly, a horizontally extending, vertically disposed web member and a pair of support members projecting from opposite sides of the web member at its lower extremity and extending the length thereof, the support members being angled downward from the horizontal. A planting tray of the aforementioned type is supported along two of its lower parallel edges by the projecting support members of two such spaced apart rails. The downward angulation of the support members is such that even the bottoms of those apertures in the planting trays which are closest to the supported tray edge will have substantial opportunity to drain and substantial exposure to circulating air.

In another of its aspects the invention provides a system of parallel, horizontally extending, uniformly spaced support rails of the above-described structure with all the rails of the system having a predetermined length. Individual rails are spaced apart from one another a distance slightly greater then the width of the planting trays, so that a planting tray with opposite lower edges resting on first and second support members of adjacent rails can be slidably positioned without binding at any location along the predetermined length.

It is an object of the invention to provide a system for supporting planting trays during their initial growth period in a greenhouse which promotes even development of all seedlings in any given tray with no preference shown to plants along the edges of a tray.

It is a further object of the invention to support the planting trays in a stable, yet slidable configuration.

The invention possesses other objects and advantages, an understanding and appreciation of which can be gained by reference to the remaining portions of the specification and the attached drawings.

DETAILED DESCRIPTION OF A PREFERRED EMBODIMENT

Figure 1:
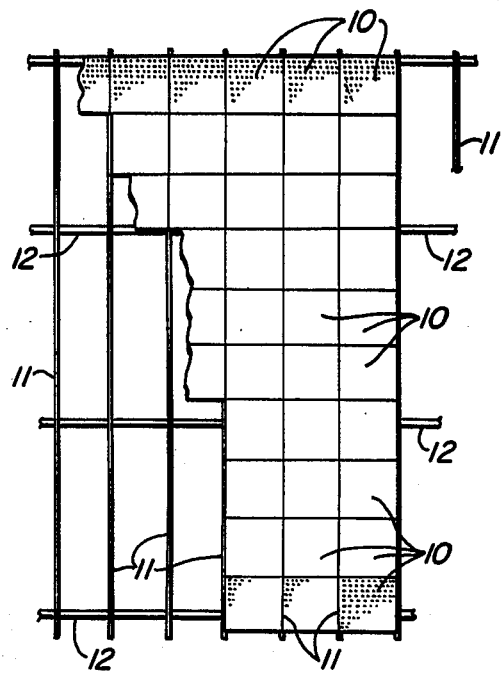
FIG. 1 is a top plan view showing an array of planting trays, partially cutaway to display the tray support system.

FIG. 1 shows a portion of a greenhouse floor plan, in which planting trays 10 are supported in a close-packed configuration on a system of parallel support rails 11. The rails 11 are themselves supported by a supporting structure, for example, the framework of parallel wooden joists 12 shown in FIG. 1.

Figure 4:
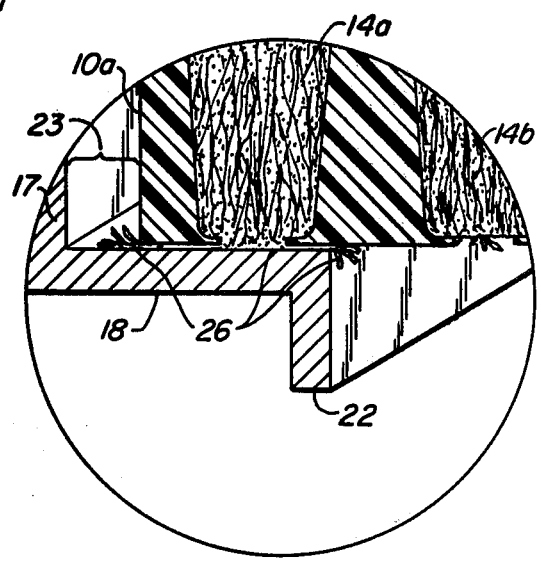
FIG. 4 is an enlarged view of a portion of FIG. 2 showing an overgrown root system produced by a rail of the prior art.

The novelty and advantages of the present invention will be better appreciated after a discussion of the problem engendered by the support rail of the prior art, which problem is discussed with reference to FIGS. 2 and 4.

Figure 2:
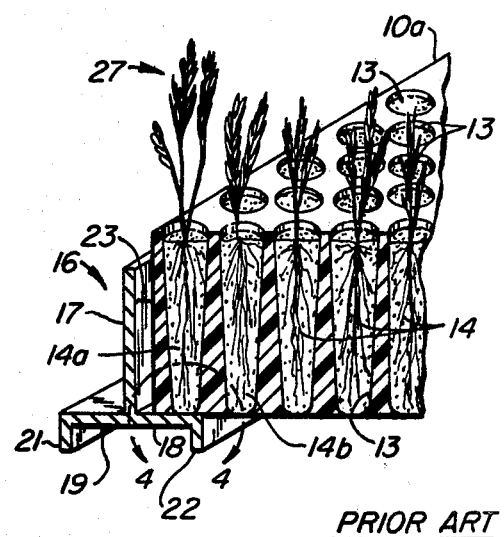
FIG. 2 is a cross-sectional perspective view showing a corner of a planting tray supported by a rail of the prior art.

FIG. 2 shows a planting tray 10a having a matrix of apertures 13 which extend through the tray. Each of the apertures 13 contains a soil plug 14, such as an elastomeric soil plug formed of soil and polymer resin in the manner disclosed by Dedolph in U.S. Pat. Nos. 4,034,508 and 4,130,072. Such soil plugs are typically frustoconical in shape measuring typically six millimeters in diameter at the lower truncated end. FIG. 2 shows a commonly found rail 16 used in the system of rails 11 to support planting trays 10. The prior art rail 16 has a central web member 17 and horizontal flanges 18 and 19 extending laterally to either side of the web member 17. The flanges 18 and 19 terminate in downturned tabs 21 and 22 which rest on the wooden joists 12 of the supporting framework.

Flanges 18 and 19 of the prior art rail 16 extend laterally, perpendicular to web member 17, a sufficient distance to support the bottom of tray 10a while providing some clearance, indicated by gap 23, between the side of tray 10a and the web member 17. The clearance helps to reduce binding when trays are slid into position between two adjacent parallel rails of the system 11.

Support systems of the above-described general type are well known from seedling technology. The problem solved by the present invention arises when the well known seedling tray support structures are adapted for use with trays carrying high density arrays of the much smaller Dedolph-type soil plugs. As illustrated in FIG. 2, because of the small diameter of soil plug 14a, laterally extending flange 18 must necessarily cover the bottom of plug 14a. It is observed that the row of plugs closest to the rail 16 experiences more rapid development than the other plugs of the tray. As seen in the enlargement in FIG. 4, the root system 26 of plug 14a grows beyond the plug and into the interstices between the bottom surface of tray 10a and the upper surface of flange 18. Accompanying the fuller root system is a fuller plant top development illustrated at 27 in FIG. 2. The amount by which plant development is enhanced depends upon the plant variety and upon the stressed environmental conditions experienced by the plant. The differential development illustrated in FIG. 2 has been exaggerated slightly for purposes of illustration. However, even a small difference in the early stages of plant development can result in undesirable differences at harvest time.

The greater plant development caused by the prior art rail 16 is disadvantageous for two reasons. First, it leads to non-uniformity of the harvested crop with the result that if the majority of plants are harvested at the proper time, then those plants which were started as seedlings along the edge of the tray will be overripe at the time of harvest. Second, as the trays are slid along the rail system 11 of FIG. 1 when being taken from the greenhouse, the overgrown root systems 26 can sometimes be severed, sending the seedling into root system shock. This can result in death of the plant with concomitant decrease in harvested yield.

Figure 3:
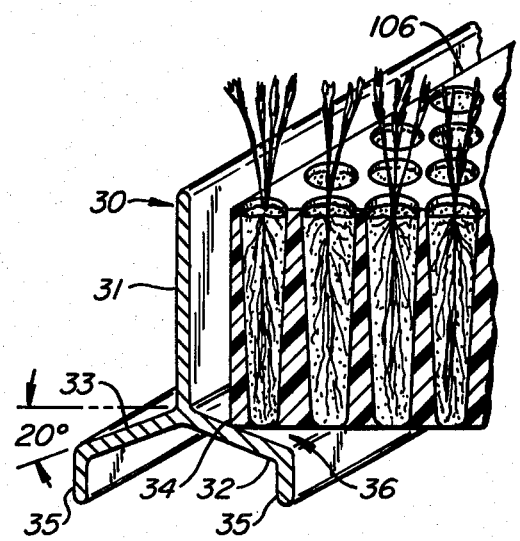
FIG. 3 is a cross-sectional perspective view showing a corner of a planting tray supported by the rail of the present invention.

These problems are overcome with the rail structure of the present invention illustrated in FIG. 3. The rail has a central, vertically disposed web member 31 and a pair of support members 32 and 33 projecting from opposite sides with web member 31 at its lower extremity. The central web member 31 and the projecting support members 32 and 33 extend lengthwise in the horizontal direction a predetermined distance sufficient to span the full length of the support rail system 11 of FIG. 1. Support members 32 and 33 are provided with standoff means 35 which extend downward so as to engage the supporting joists 12.

In the present invention, as illustrated in FIG. 3, tray 10b is supported by rail 30 not along its bottom, but rather along lower edge 34. To achieve this manner of support, the support members 32 and 33 are angled downward from the horizontal at a predetermined angle. The predetermined angle is selected so that nutrient-laden water sprayed on the tops of the trays will drain away from the bottoms of the plugs closest to the rail. The predetermined angle is also selected to provide an air space 36 between the support member 32 and the bottoms of the closest soil plugs. The air space provided by rail structure 30 is a necessary feature to insure uniform plant development for all soil plugs of the tray. Gap 36 provides for air circulation beneath the soil plugs along the tray's edge and allows all of the plug root systems of a tray, whether centrally located or located along an edge, to be uniformly air pruned. To achieve proper drainage and air pruning without sacrificing stability of tray support, the predetermined angle should fall in the range between 15° and 45°. The preferred angle is 20°.

The rail of the present invention may be readily fabricated of aluminum alloy or its recognized equivalents.

In practice, a plurality of rails 30 constructed in accordance with the invention are arranged in the parallel, uniformly spaced configuration illustrated in FIG. 1. The planting trays are then positioned on the rails by inserting them between a pair of adjacent rails at one end. The trays are pushed along the supporting rails by the next consecutive tray to be inserted at that end until the row of trays occupies the entire predetermined length of the supporting rails. The downward angulation of support members 32 and 33 enables a tray to be slid especially easily along the entire length of the rail without binding and without causing damage to the root systems. Too great a downward angulation encourages improper placement of the trays between the rails and can lead to binding of the trays.

It is emphasized that although the rail structure 30 may appear to differ only slightly from the structure of the prior art, the structural differences have a pronounced effect on plant development along the supported edge of a tray. The magnitude of the non-uniform plant development problem, and the present invention's success in solving that problem, are particularly evident when the plants are grown under high-stress conditions, for example, when the ambient growing temperature and humidity are such that the plants tend to dry out quickly and require several waterings per day. Under these conditions the plants along the tray edges will seek any remaining moisture which may be present on the supporting rails. The root system's ability to seek moisture is so great that the plant will prosper even in the presence of a supporting rail having some capacity for drainage. The rail structure 30 solving the preferential growth problem was arrived at only after a number of unsuccessful attempts were made to modify existing support rail structures to provide adequate drainage.

The above provides a full and complete description of the preferred embodiments of the present invention. Given the benefit of this disclosure, various modifications, alternate constructions and equivalents will occur to one skilled in the art without departing from the spirit and scope of the invention, which is defined by the appended claims.

What is claimed is:

1. A support rail for use in forming a system for supporting a planting tray during an initial growing period, said tray having a matrix of apertures therethrough containing seeded soil plugs, said support rail comprising:

a horizontally extending, vertically disposed web member;

first and second tray-support members projecting from opposite sides of said web member at its lower extremity and extending the length thereof, each said tray-support member being formed to present a sloped planar surface at a downward angle to the horizontal; and first and second vertically disposed, spaced-apart standoff members secured to said tray-support members at the undersides thereof and extending downward therefrom, said standoff members terminating at their lower extremities in parallel edges, whereby said rail engages an underlying rail-supporting structure only at the parallel edges of said standoff members and whereby the bottoms of apertures in said matrix closest to an edge of said planting tray will be exposed when said planting-tray edge rests along one of said planar surfaces.

2. The support rail of claim 1, wherein said sloped planar surfaces are angled downward at an angle between 15° and 45° from the horizontal.

3. A support system for use in suporting a plurality of planting trays, each tray having a matrix of apertures therethrough containing seeded soil plugs, said system comprising:

a plurality of horizontally extending, uniformly spaced, parallel support rails having a predetermined length, each said rail comprising a vertically disposed web member and first and second support members projecting from opposite sides of said web member at its lower extremity and extending said predetermined length, said support members being angled downward from the horizontal, and the rails of said plurality being spaced apart a distance slightly greater than the width of said planting trays, whereby a planting tray with opposite lower edges resting on first and second support members of adjacent rails can be slidably positioned at any location along said predetermined length.

4. A support system for facilitating uniform seedling development comprising:

a plurality of horizontally extending uniformly spaced, parallel support rails and a plurality of planting trays resting thereon; each said planting tray having a matrix of apertures therethrough and each said aperture containing a seeded soil plug; each said rail comprising a vertically disposed web member and a pair of support members projecting from opposite sides of said web member at its lower extremity; wherein an edge of each said planting tray rests on a first support member of a first rail and an opposite edge of each said tray rests on a second support member of an adjacent rail, said support members being angled downward at a predetermined angle to provide air space between said support members and the apertures of said matrix closest to the edges of said trays engaging the support members.

5. The support system of claim 4, wherein said predetermined angle is between 15° and 45° from the horizontal.

* * * * *